June 30, 1925.

A. HENDERSON

PIPE COUPLING

Filed July 10, 1924    2 Sheets-Sheet 1

1,544,004

Inventor
Albert Henderson
by his Attorneys
Baldwin Wight

June 30, 1925.
A. HENDERSON
PIPE COUPLING
Filed July 10, 1924
1,544,004
2 Sheets-Sheet 2

Inventor
Albert Henderson
by his Attorneys
Baldwin Wight

Patented June 30, 1925.

1,544,004

UNITED STATES PATENT OFFICE.

ALBERT HENDERSON, OF ALBANY, GEORGIA.

PIPE COUPLING

Application filed July 10, 1924. Serial No. 725,215.

*To all whom it may concern:*

Be it known that I, ALBERT HENDERSON, a citizen of the United States, and resident of Albany, in the county of Dougherty and State of Georgia, have invented certain new and useful Improvements in Pipe Couplings, of which the following is a specification.

My invention relates to pipe or hose couplings of the general type illustrated in the patent to Martin, 1,273,896, July 30, 1918, and has for its object certain changes in the patented structure which will increase its utility and produce a thoroughly effective device which will be operative at all times and under all circumstances.

An object of the invention is the provision of a specific form of gasket for the joining parts of the coupling which will facilitate the quick and accurate centering of the parts and will prevent any leakage.

Another object is the mounting of the operating ring which is turned to unlock the parts of the coupling in such manner that it will not be accidentally displaced or readily damaged.

Further objects will be apparent from the following detailed description and the appended claims.

In the drawings:—

Figure 1:
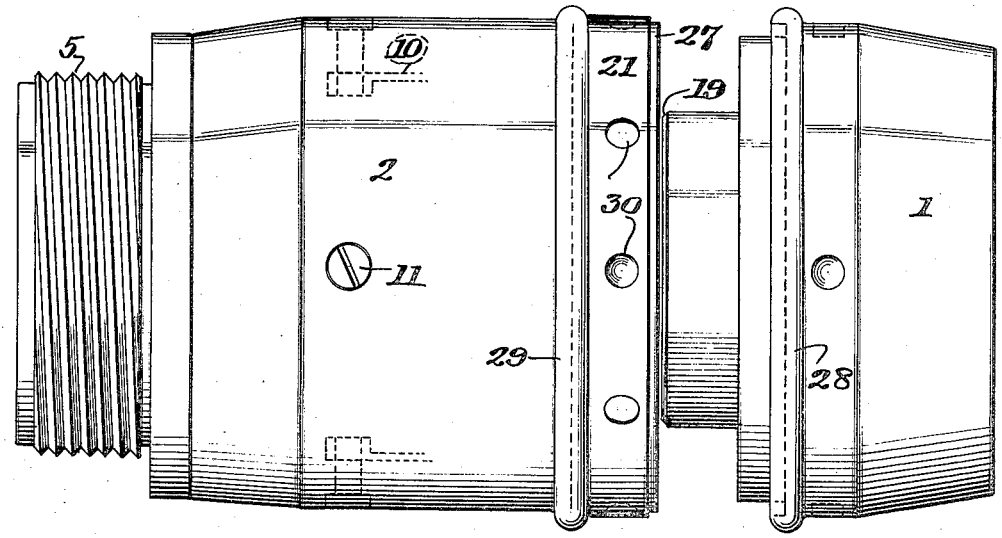
Figure 1 is a side elevation of the two parts of the coupling separated.

The coupling is illustrated as comprising two main parts 1 and 2. The former is interiorly threaded at one end as at 3 and is provided with a gasket 4, while the second is exteriorly threaded at the opposite end as at 5. This however is immaterial, since the ends of the parts 1 and 2 may be threaded or otherwise fashioned in accordance with the use to which they are to be put.

The portion 1 is provided with an internal annular slot 6 in the outer wall of which is a circumferential groove 7 forming a shoulder 8. In the part 2 are cut a plurality of longitudinal slots 9 in each of which is retained a spring latch member 10 by means of a screw 11 extending through the outer wall of the slot 9 and into the latch member 10. The outer end of each latch member 10 extends beyond the end of the member 1 and has a beveled end 12 immediately adjacent which is a transverse groove 13. When the two parts of the coupling are pushed together, the beveled ends 12 come against the shoulder 8 and are cammed inwardly. As soon as the ends 12 pass the shoulder 8 the resiliency of the latch members causes them to spring outwardly and the grooves 13 fit over the shoulder 8 preventing displacement in either direction.

Figure 3:
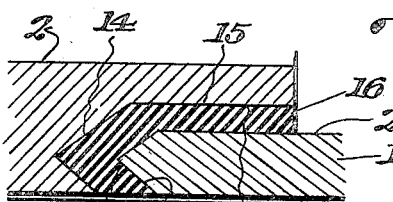
Figure 3 is a section on an enlarged scale showing the gasket and cooperating parts.

A portion of the inner wall of the member 2 is cut away adjacent its outer end to form a channel which terminates in a V-shaped groove 14, as clearly shown in Figure 3. This V-shaped groove is at a considerable distance from the end of the wall so that the bottom of the channel which is parallel to the axis of the member is of considerable extent as shown at 15. Fitting within the groove and channel is a gasket 16 of any suitable material such as rubber, and which has a corresponding shape. The gasket itself therefore has a V-shaped depression 17 and a long wall 18 parallel with the wall 15 of the channel.

The inner wall of the slot 6 in the part 1 is extended beyond the end of this member and terminates in a V-shaped edge 19 which matches the V-shaped parts 14 and 17. When the parts of the coupling are in engaging position, this V-shaped edge 19 fits tightly within the depression 17 and the outer wall 20 of the extension engages the wall 18 of the gasket. At this time the grooves 13 in the latch members have dropped into engaging position over the shoulder 8 and the parts are held in operative relation.

Owing to the fact that the gasket fits within a channel in the inner wall of the member 2 which is of the form shown, it cannot become disengaged accidentally and has no projecting parts to interfere with the engaging movement of the coupling members or to cause it to be torn by such movement. Moreover the V-shape of the engaging parts together with the long engaging wall render the construction practically water-tight under all conditions. Whatever the force of the fluid within the pipe, this pressure is all exerted in a direction which tends to tighten the gasket.

Figure 2:
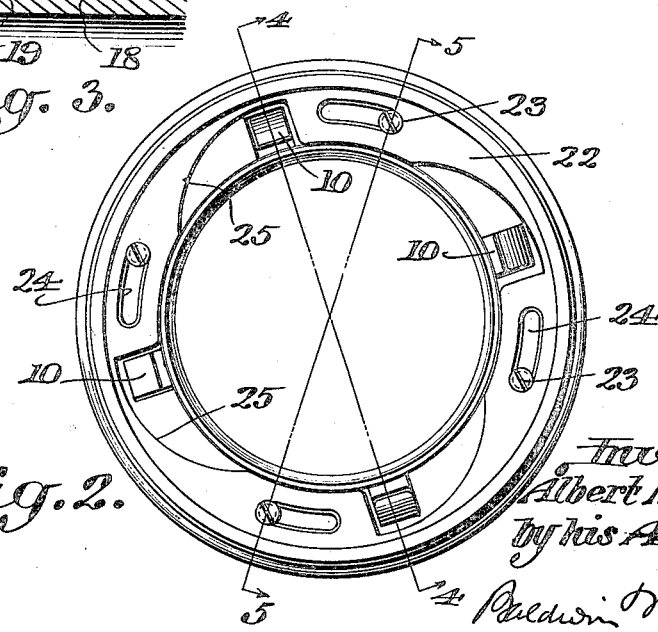
Figure 2 is an end view of the left hand part of Figure 1.
Figures 4, 5:
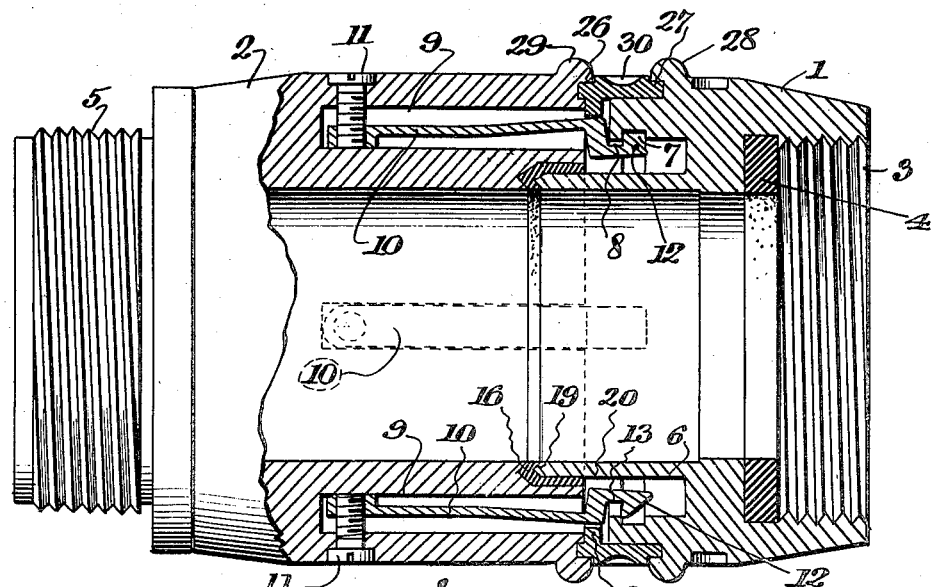
Figure 4 is a longitudinal section on the line 4—4 of Figure 2.
Figure 5 is a longitudinal section on the line 5—5 of Figure 2.

It is obviously necessary to provide some means for releasing the latches 10 when it is desired to disengage the parts. For this purpose an annular member 21 is provided which has a flange 22 that lies against the face of the end of the member 2 and is fastened thereto for limited oscillatory movement by means of screws 23 that pass through elongated slots 24 in the flange 22 and screw into the member 2. This flange is provided with cut away portions 25 forming cams as shown in Figure 2. When the parts are closed, the deepest portions of these cut aways 25 lie adjacent the latches 10, but when the ring is rotated the cams ride over the latches 10 and press them inwardly so that the grooves 13 disengage the rib or shoulder 8 and the parts can be readily disengaged.

The outer ring portion of the member 21 has a flange or rib 26 which fits in a groove in the member 2 and when the parts are closed a similar flange or rib 27 fits within a groove in the member 1. Adjacent their edges and overlying the grooves, the members 1 and 2 are provided with beads 28 and 29 respectively. The effect of this construction is that the operating ring lies in a depression between the two beads and cannot be accidentally displaced or damaged even by rough handling. It may be provided with a roughened periphery or with depressions 30 to facilitate its ready manipulation. It is also to be noted that the ring portion of the member 21 has an extended bearing surface on the outer face of the member 1.

Various detail changes may be made in the size, form and proportions of the parts without in any way departing from the spirit of the invention which is to be regarded as limited only by the terms of the appended claims.

I claim as my invention:

1. A coupling comprising two telescoping tubular members, the outer of which has a portion of enlarged inner diameter extending inward from the end thereof and terminating in a V-shaped groove and the other of which has an extending portion terminating in a V-shaped edge, a gasket fitting in said groove and extended to engage the inner wall of the enlarged portion of the first member and having a V-shaped groove to receive the edge of the second member, the outer wall of the second member engaging the extended portion of the gasket, and means for holding the members assembled in tight engagement.

2. A coupling comprising two telescoping tubular members, the outer of which has a portion of enlarged inner diameter extending inward from the end thereof and terminating in a groove having both walls at an angle to the axis of the members, and the other of which has an extending portion terminating in an edge of the same form as said groove, a gasket fitting in said groove and extended to engage the inner wall of the enlarged portion of the first member and having a groove to receive the edge of the second member and of the same form, the outer wall of the second member engaging the extended portion of the gasket, and means for holding the parts assembled in tight engagement.

3. In a coupling having two engaging parts held by latch members, a ring for releasing said latch members comprising an annular part having edge flanges which engage in grooves in said parts, and said parts having beads at their edges adjacent the ring member, whereby the latter is accurately held and guided and protected against accidental displacement.

4. In a coupling having two engaging parts held by latch members, a ring for releasing said latch members comprising an annular part carried by one member and having an extended bearing on the other, said member also having edge flanges which fit within grooves in said parts, and said parts provided with beads at their edges adjacent the ring member whereby the latter is accurately held and guided and protected against accidental displacement.

In testimony whereof, I have hereunto subscribed my name.

ALBERT HENDERSON.